Jan. 9, 1940.   F. HUMPHREYS   2,186,677
GONIOMETRIC DEVICE FOR DETERMINING THE DIP AND
STRIKE OF STRATA FROM BORE-CORE
Original Filed June 3, 1936
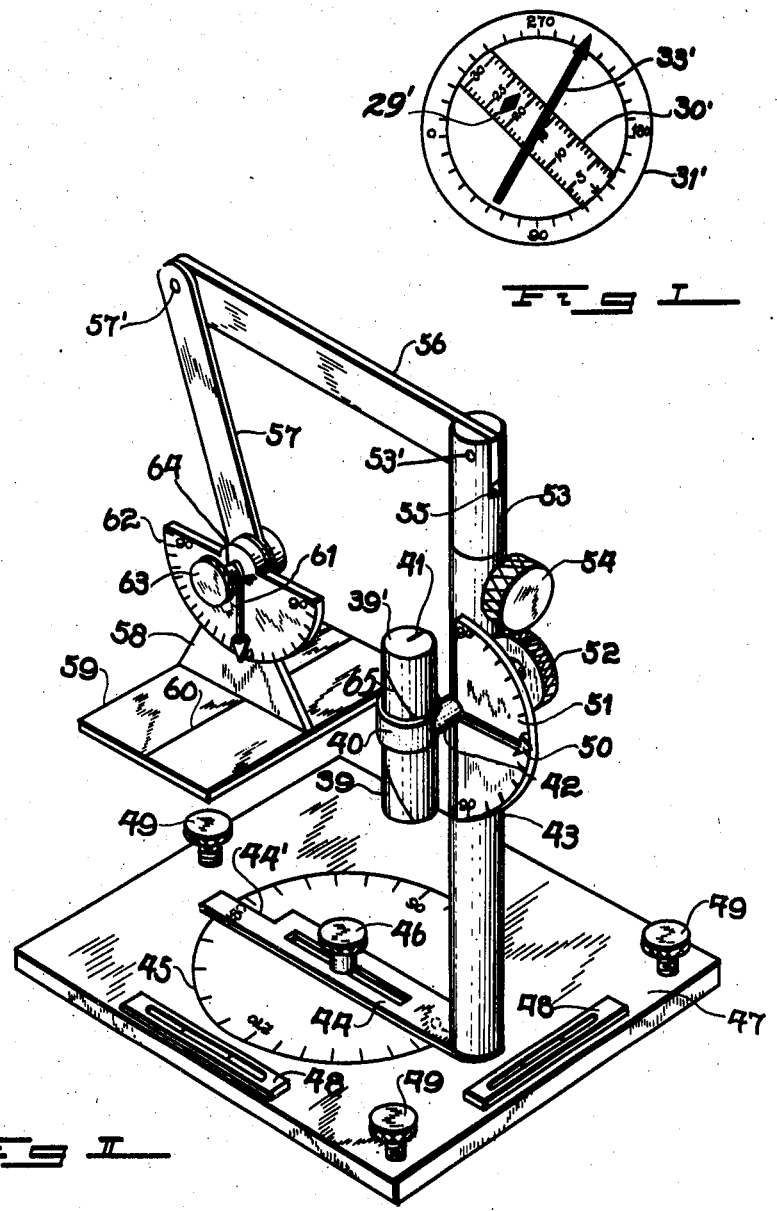
F. Humphreys
INVENTOR
By: Glascock Downing & Seebold
Attys.

Patented Jan. 9, 1940

2,186,677

UNITED STATES PATENT OFFICE 2,186,677

GONIOMETRIC DEVICE FOR DETERMINING THE DIP AND STRIKE OF STRATA FROM BORE-CORE

Frank Humphreys, Klerksdorp, Union of South Africa

Original application June 3, 1936, Serial No. 83,387. Divided and this application May 14, 1937, Serial No. 142,934. In the Union of South Africa September 12, 1935

8 Claims. (Cl. 33—1)

The present invention relates to goniometric devices for determining the dip and strike of strata existing underground. The dip of a stratum is the angle between the plane of the stratum and a horizontal plane, whilst the strike of the stratum is the angle which a vertical plane passing through the intersection of the plane of the stratum and a horizontal plane makes with a vertical plane passing through the magnetic north.

In order to ascertain the dip and strike of strata existing underground it is first of all necessary to sink a bore-hole to intersect the stratum to be investigated and to extract a piece of bore-hole from the lower end of the bore-hole. A bore-hole of any considerable depth, however, always deviates from its original vertical direction so that readings taken from the piece of bore-core when mounted in a vertical position will not correctly represent the dip and strike of the selected stratum. To interpret the bore-core correctly it is necessary to obtain a record of the inclination and magnetic bearing of the lower end of the bore-hole at the depth of the selected stratum. The inclination of the bore-hole is the angle which the axis of the bore-hole at the depth in question makes with a vertical line in the vertical plane containing said axis, and the magnetic bearing of the bore-hole is the angle which the vertical plane through the axis of the bore-hole at the depth in question makes with a vertical plane passing through the magnetic north.

An object of the present invention is to provide a goniometric device for receiving the selected portion of bore-core and for setting it to a position which corresponds in all respects with that which it occupied when in situ in the bore-hole.

Apparatus for use in obtaining data for setting the bore-core has been described in parent application Serial No. 83,387 filed June 3, 1936, and comprises a bore-hole surveying instrument which is lowered to the bottom of a bore-hole when the bore-hole has reached the depth at which it is to be surveyed. The bore-hole surveying instrument is then actuated to mark the bore-core at the lower end of the bore-hole and to record certain data which can be subsequently employed for obtaining the inclination and magnetic bearing of the lower end of the bore-hole and the magnetic bearing of the mark on the bore-core. When the bore-core has been mounted in the goniometric device its position can be adjusted in accordance with these three angles until it occupies a position which corresponds in all respects with that which it occupied when in situ in the bore-hole. It is convenient to make it substantially parallel to the position it occupied when in situ in the bore-hole.

The complete series of operations may be summarized in somewhat more detail as follows. A bore-hole is drilled to the desired depth, the surface at the bottom of the bore-hole is ground until it is a flat plane perpendicular to the axis of the lower end of the bore-hole, and all accumulated sand or silt is then removed from the bottom of the bore-hole by any suitable flushing device. The bore-hole surveying instrument is lowered to the bottom of a bore-hole and a mark is made on the flat surface at the bottom of the bore-hole by means of a resiliently yielding finger which is caused to scratch a line on said surface by slightly raising and lowering the instrument. After an interval determined by a timing device inside the instrument, a photographic record is made of the position of the devices in the instrument indicating the inclination and magnetic bearing of the bore-hole. The bore-hole surveying instrument is then removed and drilling of the bore-hole is continued so as to form a stump of core carrying the marked surface, and said stump is broken off and extracted from the hole. It is then mounted in a goniometric device provided with adjustments whereby, by making use of the photographic record, the bore-core may be set in a position which corresponds in all respects with the position that it originally occupied when in situ in the bore-hole. The dip and strike of any selected stratum in the piece of bore-core may then be read off by further devices on the goniometric device.

A description will now be given, by way of example, of a goniometric device according to the invention, reference being made to the accompanying drawing comprising Figures I and II.

Figure I shows a photographic record for use in operating a goniometric device according to the invention.

Figure II shows a goniometric device according to the invention.

It will be assumed that a piece of bore-core provided with a scratch mark at its upper end has been obtained in the manner described in the parent application Serial No. 83,387 filed June 3, 1936, and that the inclination and magnetic bearing of the lower end of the bore-hole have been recorded in the form of the photographic record of Figure I. In Figure I, 30' is the image of a deflection scale and 29' is the image of a pointer at the end of a pendulum moving over the scale; 31' is the image of a compass card and 33' is the image of the compass needle. The angle indicated by the pointer image 29' is the angle of inclination of the bore-hole, the angle between the centre line of the scale image 30' and the needle image 33' is the magnetic bearing of the bore-hole, and the angle indicated by the needle image 33' is the magnetic bearing of the scratch mark on the surface at the bottom of the bore-hole. Thus in the example shown, the inclination of the bore-hole is about 22°, the magnetic bearing of the bore-hole is about 100° east of north and the magnetic bearing of the scratch mark is about 240° east of north, i. e., 120° west of north. The piece of bore-core 39 is clamped in a holder 40 with its scratched end 39' uppermost. The elliptical line 65 indicates the trace on the cylindrical surface of the core 39, of the plane of the surface of contact between two strata, one at least of which is the stratum which is being surveyed. The holder 40 is attached to a horizontal spindle 42 mounted in an upright standard 43 so as to be rotatable about its own axis. The standard 43 is secured to one end of a horizontal base 44 which is free to rotate about the centre of a circular graduated scale 45 and may be clamped in any desired position therein by means of a thumbscrew 46. The scale 45 is marked on a plane baseboard 47 provided with levels 48 and levelling screws 49.

In order to facilitate the use of the goniometric device it is advisable to set the baseboard 47 so that the zero mark on the scale 45 points approximately to the magnetic north. The baseboard is then levelled by the levelling screws 49. When the baseboard has been thus levelled, the holder 40 is rotated about its axis until a pointer 50 fixed to the horizontal spindle 42 and moving over the graduated arc 51 indicates that the bore-core 39 has the same inclination that it had when in the earth. The holder is then clamped by tightening the thumbscrew 52. The horizontal arm 44 is then moved around the scale 45 until a cutback edge 44' which is radial to the centre of the scale 45 is against the degree mark corresponding to the magnetic bearing of the bore-hole.

The top of the standard 43 is made hollow to receive an extension piece 53 which is free to rotate about the vertical axis of the standard 43 and to be clamped in any desired position by the thumb-screw 54. The top of the extension piece 53 is provided with a vertical slot 55 arranged to receive one end of a bar 56 which is pivoted to the extension piece 53 by a horizontal pivot 53' and is thus free to rotate in a vertical plane and to be held in any desired position by a tight frictional coupling with the slot 55. A further bar 57 is pivoted to the other end of the bar 56 in a friction-tight manner by a horizontal pivot 57' so as to turn in a vertical plane and has pivoted at its other end a triangular-shaped plate 58 which is capable of being clamped to bar 57 by the thumb-screw 63 and has attached to it a transparent plate or visor 59 provided with a line 60 running along its centre at right angles to the plane of movement of the bar 56. The transparent plate 59 is attached at right angles to the plate 58. A pendulum pointer 61 hangs freely from a hub 64 in front of a degrees scale 62 which is rigidly secured to the plate 58 and is so graduated that when the plate 59 is in a horizontal plane the pendulum 61 indicates the 0° mark on the scale 62. The line 60 on the visor 59 is now brought parallel to the ascertained magnetic bearing of the scratch mark 41 by loosening thumb-screws 54 and 63, viewing down through line 60 and rotating the assembly at extension piece 53 until line 60 coincides with the angle on baseboard scale 45 corresponding to the magnetic bearing of the scratch mark as obtained from the photographic record of Figure I.

Thumb-screw 54 is now clamped; and by adjusting the position of 56, 57 and 58, the visor 59 is brought immediately above the clamped piece of core 39. Viewing down through line 60 or the parallel edge of the visor 59, the core 39 is then rotated in the holder 40 (the position of the holder remaining unchanged) until the line 60 or the parallel edge of the visor 59 coincides with the mark 41 on the upper flat surface of the core 39. The core 39 is now in a position which corresponds in all respects with that which it occupied when in situ in the bore-hole and is substantially parallel thereto.

The upper or lower face of the visor 59 is now brought into the plane of the selected stratum in the core, as that plane is revealed by its trace 65 on the periphery of the core. The movement of the visor 59 to bring it to this position comprises the following movement components in any combination which is necessary, viz., rotation of the assembly 53, 56, 57 and 59 about the axis of the vertical standard 43; angular movement of arm 56 in a vertical plane about its pivot 53; angular movement of arm 57 in a vertical plane about its pivot 57'; and angular movement of the visor 59 about its axis of rotation with respect to the arm 57, i. e., the axis of the thumb screw 63. The visor 59 then has the same dip and strike as the selected stratum. The dip of the stratum is then read off from the position of the pendulum pointer 61 with respect to scale 62 whilst the strike of the stratum is read off from the angle indicated on the scale 45 when so viewed through the visor 59 that the engraved line 60 passes through the centre of the scale 45.

I claim:

1. A goniometric device provided with a holder for receiving a piece of bore-core, a device for indicating the inclination of the axis of said holder, means for rotating said holder in a vertical plane until the axis of the holder assumes a desired inclination, a device for indicating the magnetic bearing of the axis of said holder, means for rotating said holder until its axis assumes a desired magnetic bearing, and directionally indicative means arranged to be set to a desired magnetic bearing.

2. A goniometric device provided with a holder for receiving a piece of bore-core, a device for indicating the inclination of the axis of said holder, means for rotating said holder in a vertical plane until the axis of the holder assumes a desired inclination, a device for indicating the magnetic bearing of the axis of said holder, means for rotating said holder until its axis assumes a desired magnetic bearing, a visor arranged to be set in any desired plane, and means for reading off the dip and strike of the plane occupied by said visor.

3. A goniometric device provided with a holder for receiving a piece of bore-core, means for rotating said holder in a vertical plane, a vertical standard to which said holder is attached, a horizontal base carrying said standard and rotatable in a horizontal plane, an arm attached to said standard, and a visor pivotally attached to said arm and movable in a direction parallel to any plane passing through the vertical standard and said arm.

4. A goniometric device provided with a holder for receiving a piece of bore-core, a device for indicating the inclination of the axis of said holder, means for rotating said holder in a vertical plane until the axis of said holder assumes a desired inclination, a device for indicating the orientation of the axis of said holder, means for rotating said holder until its axis assumes a desired orientation, a vertical standard to which said holder is attached, a horizontal base carrying said standard and rotatable in a horizontal plane, an arm attached to said standard, and a visor pivotally attached to said arm and movable in a direction parallel to any plane passing through the vertical standard and said arm.

5. A goniometric device provided with a holder for receiving a piece of bore-core, means including graduated scales for adjusting the position of said holder to a position in which the axis of the holder has a desired inclination and magnetic bearing, and directionally indicative means arranged to be set to a desired magnetic bearing and means for guiding the directionally indicative means during movement towards said holder whilst maintaining its set magnetic bearing.

6. A goniometric device provided with a holder for receiving a piece of bore-core, means including graduated scales for adjusting the position of said holder to a position in which the axis of the holder which coincides with the axes of pieces of bore-core when inserted therein, has a desired inclination and magnetic bearing, a visor arranged to be set to any desired plane, and means for reading off the angle which said visor makes with a horizontal plane and the angle which a vertical plane passing through the intersection of said visor and a horizontal plane makes with a vertical plane passing through the magnetic north.

7. A goniometric device provided with a holder for receiving a piece of bore-core, means including graduated scales for adjusting the position of said holder to a position in which the axis of the holder has a desired inclination and magnetic bearing, directionally indicative means arranged to be set to a desired magnetic bearing with the aid of one of said scales, and means for guiding said directionally indicative means during movement towards said holder whilst maintaining its set magnetic bearing.

8. A goniometric device provided with a holder for receiving a piece of bore-core, means including graduated scales for adjusting the position of said holder to a position in which the axis of the holder has a desired inclination and magnetic bearing, an additional graduated scale, a visor associated with said additional graduated scale, and means for indicating on said additional graduated scale the angle which the plane of the visor makes with the horizontal plane.

FRANK HUMPHREYS.